Dec. 29, 1931.  J. HAAS  1,838,760

IDENTIFICATION TAG

Filed July 30, 1929

INVENTOR
JOSEPH HAAS.
BY
HIS ATTORNEY

Patented Dec. 29, 1931

1,838,760

UNITED STATES PATENT OFFICE

JOSEPH HAAS, OF NEWPORT, KENTUCKY

IDENTIFICATION TAG

Application filed July 30, 1929. Serial No. 382,211.

This invention relates to certain improvements in identification tags which are attachable to the ears of animals, the wings of birds or fowls, or can be attached to hides or other materials and objects whereof an identification is desired. The tag is provided with a space whereon suitable identifying characters, such as the name of the owner, or his private seal, or the animal's registration number, can be impressed.

The object of the invention is to provide a simple, inexpensive device which can be attached to the animal or article and be locked securely thereto without the use of auxiliary fastening means.

A further object of the invention is to provide a tag cut or stamped from a single piece of metal, having a U shaped body member the lower face of which is provided with a depression and a slot in the bottom of the depression arranged to receive the securing prong which extends from the upper face of the body member.

A further object is to provide the prong with a rib for strengthening and limiting the extent to which the prong may enter the slot thereby preventing undue pressure being applied between the faces of the tag which, in the case of animals, would prevent the proper circulation of the blood and cause irritation to the ear of the animal so tagged.

The recessed portion of the lower face of my improved tag forms a very important part of the invention.

In tags heretofore constructed, the prong, when passing through the ear of an animal or other material of tough texture, often became displaced with relation to the slot, thereby causing the point of the prong to strike the inner face of the lower portion of the body member. This invariably resulted in the prong curling or doubling up within the inner faces of the tag and thereby preventing secure attachment.

In my device, the prong engaging the ear or other article compresses the ear or other material into the recess thereby starting the prong in a true line with the slot. Should the prong deviate from the line of the slot, it will strike the tapered wall of the recess and be guided into the slot and thereafter clinched.

Figure 1:
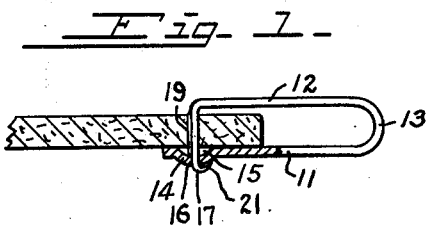
Figure 2:
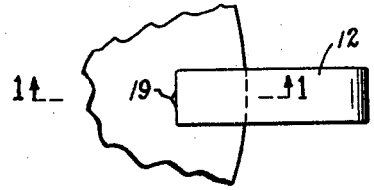
Figure 3:
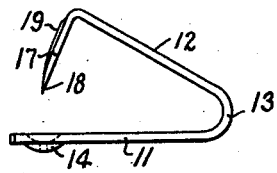
Figure 4:
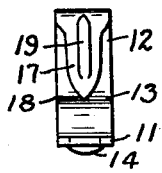
Figure 5:
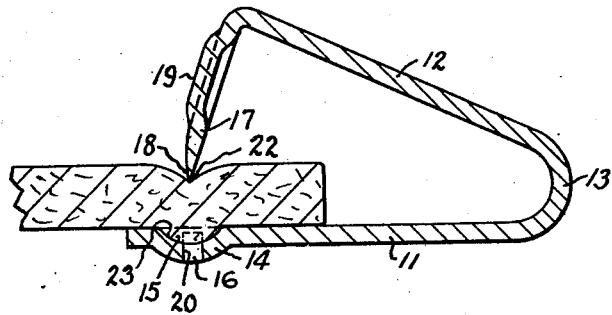
Figure 6:
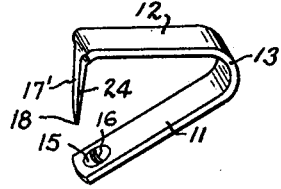

The invention will be further readily understood from the following description and claims and from the drawings, in which latter:

Fig. 1 is a side elevation of the tag in secured relation and partly in section on the line 1—1 of Fig. 2, Fig. 2 is a plan view of the same, Fig. 3 is a side elevation of the same, Fig. 4 is a front elevation of the same, Fig. 5 is an enlarged sectional view of the same, showing the article being compressed into the recess, and Fig. 6 is a perspective view of a modified tag.

I prefer to form the tag out of a single piece of metal having a base 11 and an upper section 12. The sections forming a U with a bend 13 between them. Adjacent to the end of the base I provide a pressed out circular concave portion 14 which forms a recess 15. A slot 16 is centrally located relative to the recess and extends transversely of the base 11.

The upper section 12 has a depending prong 17 which is pointed as at 18 to readily pierce the material or object to which it is to be attached. A longitudinal rib 19 extends throughout a major portion of the prong. This rib aids in stiffening the prong and also limits the downward movement of the prong relative to the base.

In clamping the tag to an object a suitable tool is employed for forcing the prong through the object and for bringing the upper section in approximately a parallel relation to the base. When in this relation the rib 19 will come in contact with the wall 20 of the slot and thereby prevent further reception of the prong within the slot. The end of the prong is then clinched over as at 21, (see Fig. 1) to firmly lock the tag to the object.

When affixing the tag to an object, such as the ear of an animal, the prong forces the object into the recess, thereby forming a depressed portion 22 in the object which point of depression will aid in guiding the prong to the slot. Upon failure of the prong to aline with the slot it will strike the concave surface 23 of the recess which will guide the prong into the slot (see Fig. 5).

In Fig. 6 I have shown a modified form of tag provided with a prong 17' which has tapering faces 24 arranged to contact with the ends of the slot 16 for limiting the distance to which the prong may enter the slot.

I prefer to use this modified form on tags of smaller dimensions, such as are attached to the wings of fowls or birds wherein the substance to which it is attached is more readily pierced.

Having thus fully described my invention, what I claim as new and desire to secure by Letters Patent is:

1. An identification tag provided with a base portion, an upper member provided with a prong, a slot adjacent to the end of said base portion, said slot arranged below the plane of said base portion and means adjacent to said slot for guiding said prong to said slot.

2. An identification tag comprising a member bent into a U shape, an opening below the plane and adjacent to one end of said member, a prong extending from the other end of said member, said member provided with a concave depression about said opening for guiding said prong to said opening.

3. An identification tag provided with a concave portion, an opening at the base of said concave portion, and a securing prong arranged to be guided to said opening by said concave portion.

4. An identification tag provided with a base portion, an upper member provided with a prong, a slot below the plane and adjacent to the end of said base portion, a concavity about said slot for guiding said prong to said slot and means on said prong for limiting reception of said prong into said slot.

In testimony whereof, I have hereunto signed my name.

JOSEPH HAAS.